United States Patent
Feres

[11] Patent Number: 5,259,927
[45] Date of Patent: Nov. 9, 1993

[54] APPARATUS FOR THICKENING LIQUIDS

[76] Inventor: Vaclav Feres, 302 Buena Vida Cir., Las Cruces, N. Mex. 88001

[21] Appl. No.: 842,548

[22] Filed: Feb. 27, 1992

[30] Foreign Application Priority Data

Feb. 27, 1991 [DE] Fed. Rep. of Germany ....... 4106112

[51] Int. Cl.$^5$ ............................................. B01D 1/22
[52] U.S. Cl. .................................... 159/6.1; 159/28.6; 159/49; 159/DIG. 42; 165/86; 165/88; 202/236; 203/89
[58] Field of Search ......... 159/6.1, 28.6, 49, DIG. 42; 202/236, 269; 203/89; 165/86-88, 167, 115

[56] References Cited

U.S. PATENT DOCUMENTS

| | | | |
|---|---|---|---|
| 1,588,929 | 6/1926 | Zohe | 159/6.1 |
| 2,218,342 | 10/1940 | Pegram | 159/6.1 |
| 2,455,059 | 11/1948 | Hickman | 159/6.1 |
| 2,801,084 | 7/1957 | Krupp et al. | 159/16.1 |
| 2,894,879 | 7/1959 | Hickman | 159/6.1 |
| 3,221,807 | 12/1965 | Johansson | 159/6.1 |
| 3,595,299 | 7/1971 | Weishaupt et al. | 159/28.5 |
| 3,640,330 | 2/1972 | Javet | 159/6.1 |
| 3,840,070 | 10/1974 | Becker et al. | 159/28.6 |
| 3,844,725 | 10/1974 | Nenicka | 159/6.1 |
| 4,153,500 | 5/1979 | Fores | 159/6.1 |
| 4,511,436 | 4/1985 | el Din Nasser | 159/17.1 |
| 4,627,890 | 12/1986 | Porter et al. | 159/6.1 |

FOREIGN PATENT DOCUMENTS

| | | | |
|---|---|---|---|
| 0123390 | 10/1984 | European Pat. Off. | 159/6.1 |
| 0948390 | 8/1982 | U.S.S.R. | 159/6.1 |

OTHER PUBLICATIONS

Clark et al., "Multiple Effect Rotating Evaporator" Chemical Engineering Progress vol. 57, No. 1 pp. 64-70.

Primary Examiner—Virginia Manoharan
Attorney, Agent, or Firm—Antonelli, Terry, Stout & Kraus

[57] ABSTRACT

An apparatus for thickening liquids with solid contents has a container receiving the liquid and a vapor outlet and a heater, which is positioned in the liquid column in the container. The heater is constructed as a rotor rotating in the container and is formed from a plurality of substantially parallel plates arranged with a limited axial spacing and extending outwards from the rotor axis, every second space between adjacent plates forming a heating chamber sealed with respect to the liquid, while the spaces located between the same close to the rotor axis and on the circumference thereof are open towards the container interior.

10 Claims, 2 Drawing Sheets

APPARATUS FOR THICKENING LIQUIDS

FIELD OF THE INVENTION

The invention relates to an apparatus for thickening liquids with solid contents, particularly natural juices, with a container receiving the liquid and having a vapor outlet and a heater, which is located within the liquid column in the container.

BACKGROUND AND SUMMARY OF THE INVENTION

Evaporators with a stationary heater or circulation evaporators are used for thickening liquid with solid contents. Circulation evaporators have a higher evaporating efficiency, but fail in the case of viscous products, or when there are higher solid concentrations in the liquid. Conventional film-type evaporators with fixed evaporating surfaces do not have an adequate evaporating efficiency, whereas those having rotating evaporating surfaces operate with very thin liquid films, which can no longer be maintained with larger solid particles. The particles do not flow along, the film breaks and there is local overheating, which in turn leads to caking and encrustations.

The problem of the present invention is to so construct an apparatus of the aforementioned construction, that a high evaporating efficiency is obtained and it is possible to thicken the liquid up to a relatively high solid content.

According to the invention this problem is solved in that the heater is constructed as a rotor rotating in the container and is formed from a plurality of substantially parallel plates arranged with a limited axial spacing and extending outwards from the rotor axis, every second space between adjacent plates forming a heating chamber sealed with respect to the liquid, while the spaces located between the same close to the rotor axis and on the circumference thereof are open towards the container interior.

Between the plates arranged with a limited axial spacing are formed axially symmetrical gaps, which alternately serve as a heating chamber and an evaporating chamber, in that the spaces located between the heating chambers and close to the rotor axis and externally are open to the liquid present in the container. As a result of the rotation of the rotor the liquid between the plates is centrifugally accelerated towards the outside, i.e. is constantly "sucked" from the inside and transported to the outside. As a result of the limited distance between adjacent heating surfaces, which define an evaporating chamber, high flow forces act on the liquid which, in conjunction with a correspondingly high speed, ensure a constant cleaning of the chamber, so that the solid particles cannot become attached to the heating surfaces. The rotor does not act solely as a heater, but also as a pump, the friction between the liquid and the plates bounding the heating chambers keeping the same clean. The heat carrier can be guided in the heating chambers in such a way that it is also transported from the inside to the outside as a result of the centrifugal forces.

According to an advantageous embodiment, the rotor has a lower part forming a heat carrier chamber and which in its center and on its circumference carries the plates joined together in a stack-like manner.

The present embodiments are in particular characterized by a simple construction, which is of a self-supporting nature for the rotor. The heat carrier for the heating chambers is supplied by means of the lower part. For example, the lower part can be connected by means of a hollow drive shaft of the rotor to a heat carrier circuit.

A simple construction is obtained if the plates close to the rotor axis and close to its circumference are interconnected and connected to the lower part by means of several symmetrically distributed screw bolts with spacers. Thus, the rotor can easily be adapted to the particular requirements (container volume, evaporating efficiency, etc.), in that a corresponding number of plates are combined in stack-like manner and fixed together by means of the screw bolts.

Another appropriate embodiment is characterized in that the heating chambers close to the rotor axis are connected by means of at least one axially parallel, hollow bolt to the heat carrier chamber in the lower part and on the circumference with at least one further axially parallel hollow bolt issuing into the lower part. Appropriately all the screw bolts form the hollow bolts for the supply and/or removal of the heat carrier.

If it is a vaporous heat carrier, then condensate is deposited on the external bolts and as a result of the rotating rotor the condensate collects at the outside and can be removed therefrom by a skimming tube.

In order to avoid a corotation of the liquid in the container as a result of the rotation of the rotor, above the rotor in the container and below the liquid level are provided flow-breaking fittings. These can be plates, strips or the like arranged crosswise within the container.

The plates bounding the heating chambers and the evaporating chambers can be arranged in radial planes with respect to the rotor axis. This leads to a particularly flat or shallow construction. However, in place of this, over at least part of their radial extension the plates can rise conically towards the outside. As a result, for the same radial extension, the flow paths in the evaporating chambers can be lengthened and the effective shear forces are further increased. This can be alternately or additionally achieved in that the plates are constructed as corrugated plates over at least part of their radial extension.

The invention is described in greater detail hereinafter relative to two non-limitative embodiments and the attached drawings:

DETAILED DESCRIPTION OF DISCLOSED EMBODIMENTS

Figure 1:
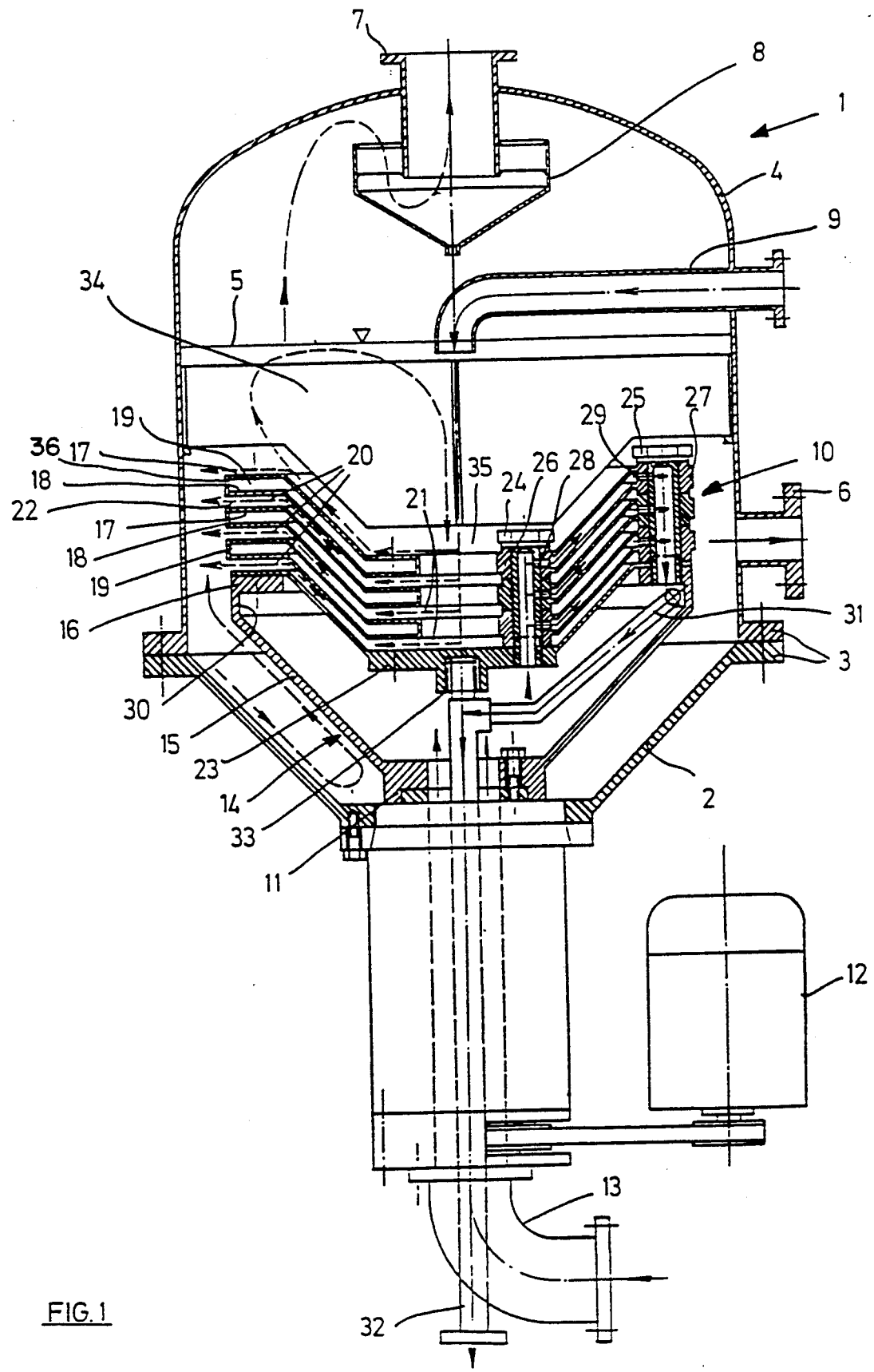
FIG. 1 is an axial section through the apparatus.

The apparatus according to FIG. 1 has a container 1, which comprises a lower part 2 and an upper part 4 detachably connected thereto by means of flanges 3. The container is filled up to the level 5 with the liquid to be thickened. It has a concentrate oulet 6 and a vapor outlet 7 with a droplet separator 8 connected upstream thereof. The liquid starting product is fed into the container 1 by means of the feed line 9.

Within the container 1 and below the liquid level 5 is provided a rotor 10, which forms the heater. The rotor 10 is connected to a hollow shaft 11, which is driven by a motor 12 located outside the container and is sealed with respect to the stationary lower part 2 of the container 1 by means of slip ring seals. A pipe connection 13 is connected to the hollow shaft 11 by means of a slip ring seal or the like and enables the heat carrier for the heater, e.g. in the form of heating steam to be supplied, as is indicated by the directional arrows.

The rotor 10 has a lower part 14 with a rotor casing 15 widening conically outwards from the hollow shaft 11 and which is drawn inwards in flange-like manner at its upper end at 16. The lower part 14 with the inwardly drawn flange 16 forms the carrier for the heater, which comprises a plurality of parallel plates having a limited reciprocal axial spacing. Adjacent plates 17, 18 are interconnected at their ends by plate portion 36 in each case to form a heating chamber 19 sealed with respect to the container interior and the liquid located therein, while the intermediately positioned spaces 20 both in the vicinity of the center at 21 and on the circumference are open to the liquid. In the represented embodiment the plates 17, 18 are constructed as conical surfaces over part of their radial extension. They are otherwise interconnected by a plurality of screw bolts 24, 25 with spacers 26, 27 and are kept spaced and connected to the flange 16 of the lower part 14 or a centrally positioned base 23. The inner screw bolts 24 and the outer screw bolts 25 are hollow and the bore thereof is open towards the lower part 14. The hollow screw bolts 24, 25 and the spacers 26, 27 also have transverse bores 28, 29 providing a connection to the heating chambers 19.

Below the support flange 16 of the lower part 14 there is provided a collecting channel 30 for the condensate when using a vaporous heat carrier and in which engages a skimming tube 31, which is guided in the center of the rotor and in the form of a central discharge tube 32 is passed to the outside through the hollow drive shaft 11. The upper end of the discharge tube 32 located in the lower part engages in a step bearing 33 to prevent any vibration of the discharge tube.

Above the rotor 10 and below the liquid level 5, the container 1 contains flow-breaking fittings 34, e.g. in the form of a crossing plate system or the like.

When the rotor 10 is rotating the liquid is sucked into the axially open center 35 and at 21 passes into the spaces 20 between the heating chambers 19, is accelerated centrifugally to the outside and at 22 passes out of the container again. During this travel and particularly on exiting, part of the liquid is evaporated, so that with increasing operating times the container content is thickened. A further evaporation takes place due to heat exchange on the rotor casing 15 of the lower part 14. Despite the solid contents contained in the liquid, e.g. pulp in the case of fruit or vegetable juices, due to the high flow rate and the considerable shear forces in the spaces or chambers 20, there are no blockages, caking, encrustations, etc. on the heating surfaces of the heating chambers 19. The heat carrier supplied by means of the connection 13 and the hollow drive shaft 11 passes via the hollow screw bolts 24 close to the rotor axis into the heating chambers 19, flows through the latter and passes via the outlets 29 into the hollow screw bolts 25 and from there flows back again into the lower part 14. Any condensate is driven to the outside and is removed from the lower part 14 by the skimming tube 31. The evaporated liquid loss during thickening can be compensated up to the liquid level 5 by means of the feed line 9 until the desired concentration is reached. The concentrate is then pumped out by means of the connection 6. The apparatus according to FIG. 1 operates batchwise, but a continuous operation is also possible.

Figure 2:
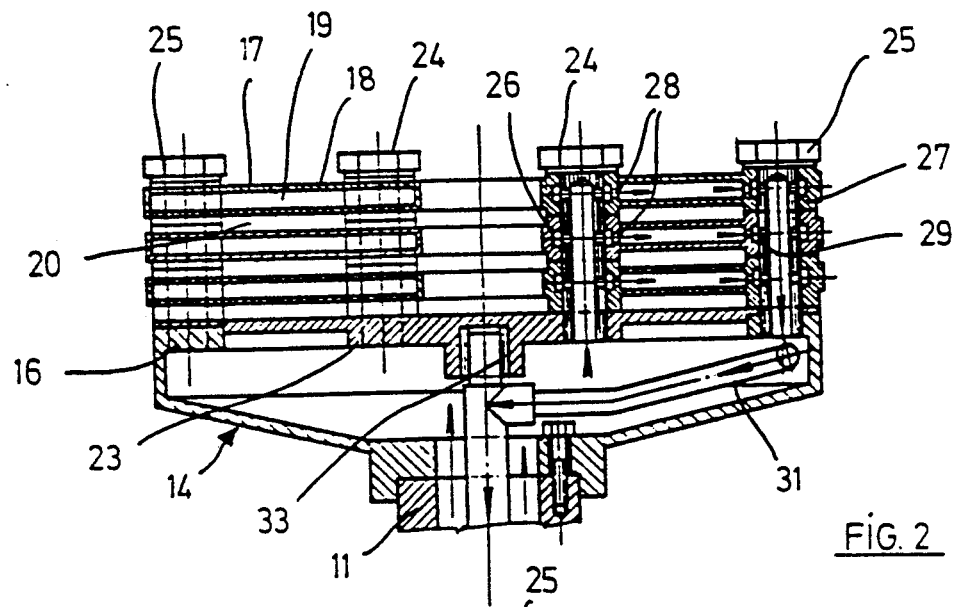
FIG. 2 is an axial section through another rotor embodiment along section line II—II of FIG. 3.
Figure 3:
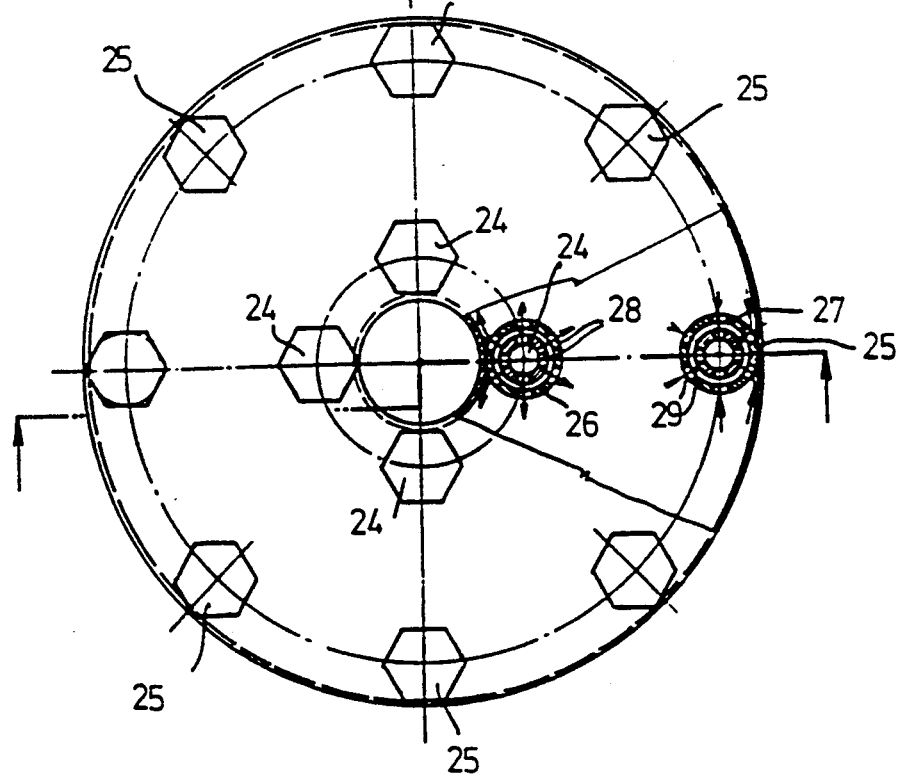
FIG. 3 is an plan view of the rotor of FIG. 2.

The embodiment according to FIGS. 2 and 3 differs from that of FIG. 1 only in that plates 17, 18 are arranged in radial planes, so that also the heating chambers 19 and the intermediately positioned evaporating chambers 20 extend substantially radially, which reduces the construction height.

For the operation of the apparatus, the speed, optionally as a function of the degree of thickening, is preferably selected in such a way that the product flowing outwards from the rotation center into the chambers 20 is slightly overheated due to the powerful flow and frictional forces and is not evaporated, the evaporation process only taking place on leaving at 22. The flash evaporated liquid is then sucked back into the rotor center.

I claim:

1. Apparatus for thickening liquids with solid contents, comprising a container for receiving a liquid with solid contents which fills said container up to a first level and said container having a vapor outlet located above said first level and a heater, which is located in said container at a level below said first level so that it is within a liquid column in the container when said container is filled with said liquid to said first level, means for rotating the heater as a rotor in the container, said heater comprising a plurality of substantially parallel plates arranged with a limited axial spacing in said container and extending outward from an axis of the rotor means for sealing every second space between adjacent plates from the container interior to form heating chamber sealed with respect to liquid in the container, the spaces located between the heating chambers being open to the container interior adjacent to the rotor axis and on the circumference thereof to permit the flow of said liquid with said solid contents through the spaces by centrifugal force with rotation of said rotor and means located in said container above said rotor and below said first level for breaking the flow of liquid pumped by said rotor to avoid corotations thereof with said rotor.

2. Apparatus according to claim 1, wherein the rotor has a lower part forming a heat carrier chamber and which in its center and on its circumference carries said plates which are combined in a stack.

3. Apparatus according to claim 2, wherein the lower part is connected by means of a hollow drive shaft of the rotor to a heat carrier circuit.

4. Apparatus according to claim 3, wherein adjacent the rotor axis and the circumference thereof, the plates are interconnected by means of several symmetrically distributed screw bolts with spacers and are connected to the lower part.

5. Apparatus according to claim 4, wherein adjacent the rotor axis, the heating chambers are connected by means of at least one axially parallel, hollow bolt to the heat carrier chamber in the lower part and on the circumference to at least one further axially parallel, hollow bolt issuing into the lower part.

6. Apparatus according to claim 5, wherein the screw bolts form the hollow bolts for connecting the heating chambers to the heat carrier chamber in the lower part.

7. Apparatus according to claim 1, wherein said means for breaking the liquid flow includes flow-breaking fittings.

8. Apparatus according to claim 1, wherein the plates are arranged in radial planes with respect to the rotor axis.

9. Apparatus according to claim 1, wherein at least over part of their axial extension, the plates rise conically to the outside.

10. Apparatus according to claim 1, wherein at least over part of their axial extension, the plates are constructed as corrugated plates.

* * * * *